J. HIBBARD.
Gate.
No. 61,832.
Patented Feb. 5, 1867.
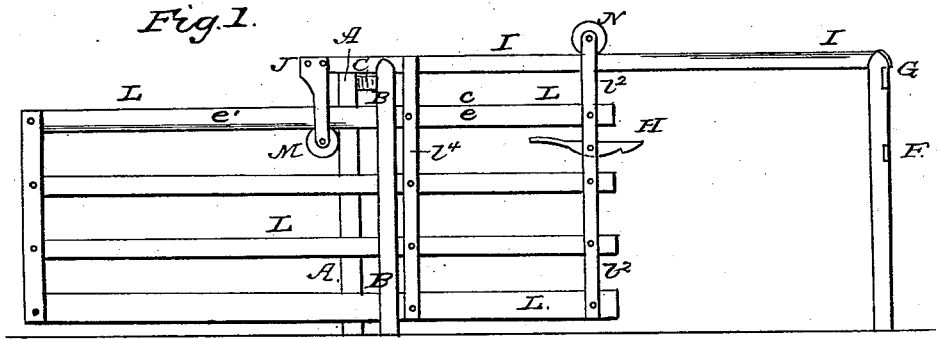
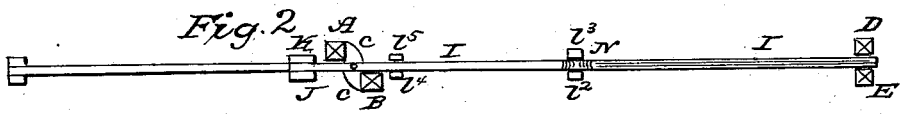
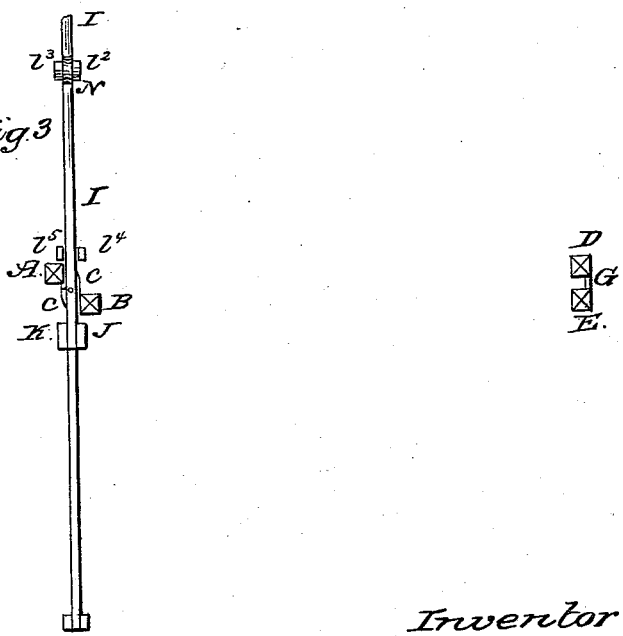
Witnesses.
Inventor

United States Patent Office.

JEROME HIBBARD, OF PROSPECT LAKE, MICHIGAN.

*Letters Patent No. 61,832, dated February 5, 1867.*

---

IMPROVEMENT IN GATES.

---

The Schedule referred to in these Letters Patent and making part of the same.

---

TO ALL WHOM IT MAY CONCERN:

Be it known that I, JEROME HIBBARD, of Prospect Lake, Van Buren county, State of Michigan, have invented a new and useful Improvement in Gates; and I do hereby declare that the following is a full, clear, and exact description thereof, which will enable others skilled in the art to make and use the same, reference being had to the accompanying drawing, forming part of this specification, in which—

Figure 1 is a side view of my improved gate, pushed back ready to be swung open.

Figure 2 is a top view of the same.

Figure 3 is a top view of the same when fully opened.

Similar letters of reference indicate like parts.

My invention has for its object to furnish an improved gate, simple in construction and convenient in operation; and it consists, first, in the combination of the two rear gate-posts, and connecting cross-bar with each other and with the gate; second, in pivoting the gate to the cross-bar, connecting the two rear posts; third, in the swing-bar and downwardly projecting arms, connected, arranged, and operated in the manner herein described, in combination with the rear and front gate-post, and with the top bar and front uprights of the gate, as hereinafter more fully described.

A and B are the rear gate-posts, between which the gate slides backward and forward. These posts are both set into the ground, the one a little in advance of the other, as shown in figs. 1, 2, and 3; and their upper ends are connected together by the cross-bar C, firmly secured to the front side of the post A, and to the rear side of the post B. The projecting corners of this bar C are rounded off, as shown, so that it may not interfere with the swinging of the gate. D and E are the two front gate-posts, which are set into the ground side by side, at a distance apart such that the projecting ends of the horizontal bars of the gate may enter between the said posts. These posts are connected together by the cross-bars F and G; the one, F, of which is placed at any convenient height for the latch H to catch upon; the other, G, is placed near the tops of said posts for the forward end of the swing-bar I to rest upon, as shown in fig. 1. The front end of the bar I, when closed, rests upon the cross-bar G, which connects the posts D and E, as shown in fig. 1; and its rear end upon the cross-bar C connecting the rear posts A and B, to which it is pivoted by a pin attached to either the bar C or I, and working in a socket formed in the other bar. To the rear end of the swing-bar I are attached two downwardly projecting arms, J and K. These arms extend downward, one on each side of the upper horizontal rail $l'$ of the gate L, and between their lower ends is pivoted a friction-pulley, M, in such a position that the lower edge of the bar $l'$ of the gate may rest and move back and forth upon it. The face of this pulley M is grooved, and the lower edge of the bar $l'$ of the gate is rounded off so as to fit into the groove of the pulley, so that the said pulley may act as a guide to the gate as it moves back and forth. The end pair of upright bars, $l^2$ and $l^3$ of the gate L, extend upward, one on each side of the swing bar I, and to their upper ends is pivoted a pulley, N, which rests upon the upper edge of the swing-bar I, and supports the forward end of the gate L as it moves back and forth. The face of the pulley N is grooved and the upper edge of the swing-bar I is rounded off so as to fit into the groove of the pulley and act as a guide to it as the gate is moved back and forth. The upright strengthening bars $b^4$ and $b^5$ of the gate also extend up, one on each side of the swing-bar I, as shown in figs. 1, 2, and 3.

In operating the gate it is first pushed into the position shown in figs. 1 and 2; it is then slightly tilted to raise the forward end of the swing-bar I from the posts D and E, which allows the gate L and bar I to be swung around until the forward end of the bar I has described a quarter of a circle, in which position it is stopped by coming in contact with the front side of the post A and the rear side of the post B, as shown in fig. 3.

I claim as new, and desire to secure by Letters Patent—

1. Pivoting the gate L, by means of the swing-bar I, to the cross-bar C, connecting the two rear posts A and B, substantially as described and for the purpose set forth.

2. The swing-bar I, and downwardly projecting arms J and K, constructed, arranged, and operated in the manner described, in combination with the rear and front gate-posts A, B, D, E, and with the front uprights $l^2$ $l^3$ of the gate L, substantially as described and for the purpose set forth.

JEROME HIBBARD.

Witnesses:
H. JACOBS,
H. B. HULSE.